United States Patent [19]

Ost

[11] Patent Number: 4,487,500
[45] Date of Patent: Dec. 11, 1984

[54] PHOTOGRAPHIC REPRODUCTION SYSTEM

[75] Inventor: Clarence S. Ost, Margate City, N.J.

[73] Assignee: Electronic Mechanical Products Co., Atlantic City, N.J.

[21] Appl. No.: 363,070

[22] Filed: Mar. 29, 1982

[51] Int. Cl.³ ............................................. G03B 13/28
[52] U.S. Cl. ......................................... 355/44; 355/68
[58] Field of Search ..................... 355/38, 68, 69, 71; 356/227; 250/559

[56] References Cited

U.S. PATENT DOCUMENTS

| | | | |
|---|---|---|---|
| 3,542,470 | 11/1970 | Ost ..................................... | 355/71 X |
| 4,068,943 | 1/1978 | Gyori .................................... | 355/38 |
| 4,179,214 | 12/1979 | Pone, Jr. ............................. | 355/38 X |
| 4,264,194 | 4/1981 | Pone et al. ............................ | 355/68 |

Primary Examiner—Richard A. Wintercorn
Attorney, Agent, or Firm—Charles A. McClure

[57] ABSTRACT

Photographic reproduction of copy, with or without a halftone or vignetting dot type of screen, is controlled by measuring and storing optical densities of copy to be reproduced and calibration data for equipment used in such density measurement, as well as values of other pertinent parameters. This system involves interaction between a human operator and an inanimate assistant commonly recognized as a computer. The operator does such acts as juxtaposing a densitometer component of the system to selected parts of the copy, to density standards, and to test or trial reproductions to obtain and input data. The operator also may supply, either by measurement or specification, such other relevant data as actinic, chromatic, dimensional, etc. To assist the operator the computer displays various announcements, inquiries, and instructions, as well as data and computation results. The information supplied is processed by the computer according to appropriate computational and procedural rules with emphasis upon determination and control of exposure light flux to assure desired quality of reproduction.

17 Claims, 8 Drawing Figures

DISPLAYS COPYRIGHT © 1982 EMPCO

Fig. 5B

PHOTOGRAPHIC REPRODUCTION SYSTEM

This invention relates to the controlling of photographic reproduction and is especially useful in graphic arts phototechniques wherein a screen is utilized with the copy to be photographed, thereby imposing special requirements upon exposure determination and control.

It is in part an improvement upon the subject matter of my U.S. Pat. No. 3,542,470 and Brit. Pat. No. 1,286,603, whose contents are incorporated herein by this reference in the interest of minimizing needless repetition and as the most pertinent patent art known to me.

As is well known, use of a halftone or vignetting dot type of screen limits the tonal range of a screened photographic reproduction of continuous-tone copy. "Copy" is anything to be copied, which itself may or may not be a copy of anything else. "Screen range" is the difference in optical density between the areas of the copy conducive to reproduction of an optimum highlight dot and an optimum shadow dot, respectively, when exposed for a basic copy exposure. If the tonal range of the copy to be photographed, which may be called the "copy range", exceeds the screen range—as it customarily does—tones will be lost in the lightest portion or the darkest portion (or both), at least whenever only a single exposure is made. Alternatively, if the screen range exceeds the copy range, the copy will be reproduced "as is" instead of being improved by being stretched over the screen tonal range.

Techniques are known for compensating for such discrepancies between copy range and screen range of tone or optical density, by making more than one exposure and carefully calculating and controlling the light flux at each exposure. My aforementioned patents teach such techniques, including main, bump, and flash exposures, and their availability is assumed here. Similar compensation can be accomplished for high key copy and for low key copy, through shifting of a preferred midtone dot toward the highlight or the shadow end, respectively, to enhance highlight or shadow detail. No-screen photographic reproduction can be improved similarly by manipulating exposure and development time.

Mathematical explanations of many such matters are set forth by H. Brent Archer in two papers available as reports of the Information Service of the Rochester Institute of Technology Graphic Arts Research Center: No. 158, entitled "Calculation of Multiple Halftone Exposure Time for Three Point Control" (May 1977); and No. 162, entitled "New Information on the Calculation of Halftone Exposure Times" (May 1980). The contents of these papers are incorporated herein in their entirety by this reference. An understanding of the present invention will be facilitated by scrutiny of the Archer papers, notwithstanding that in certain respects (indicated below) this invention extends beyond or departs from his valuable teachings. For convenience, the present specification adopts the Archer notation or symbology for the most part, modified and supplemented as indicated below.

A primary object of the present invention is a systematic procedure for obtaining and storing pertinent density data and related information to be retrieved and used for controlling photographic reproduction.

Another object of this invention is provision of an interactive computer-assisted system in which participation of a normally competent human operator assures excellent quality of photographic reproduction.

A further object of the invention is coached self-instruction of operators in determining and effecting photographic reproduction control.

A specific object is exposure compensation for deviations of developer and image medium characteristics (that affect the reproduction) from specified or otherwise determined values in a light-integrating method of halftone photographic exposure.

Yet another object is control of midtone, as well as highlight and shadow, in halftone screened and in unscreened continuous tone photographic reproduction.

A still further object is utilization of such methods of controlled photographic reproduction for copy in color as well as black and white.

A complementary object is provision of apparatus useful in accomplishing the foregoing objects.

Other objects of the present invention, together with means and methods for attaining the various objects will be apparent from the following description and the accompanying diagrams, which feature a preferred embodiment of the invention by way of example rather than limitation.

Figure 1:
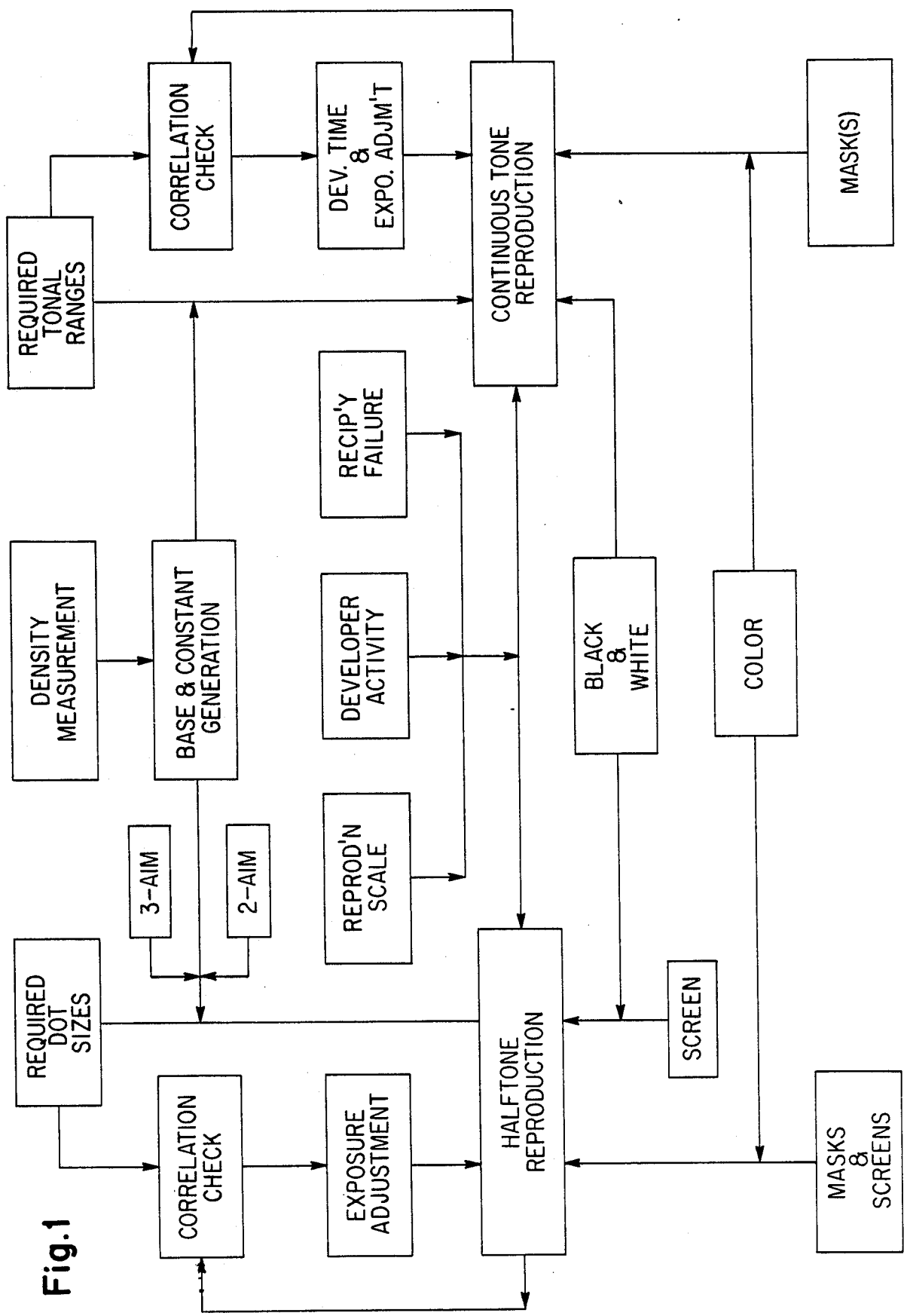
FIG. 1 is a diagrammatic layout of procedural components of, or useful in relation to, the present invention.
Figure 3A:
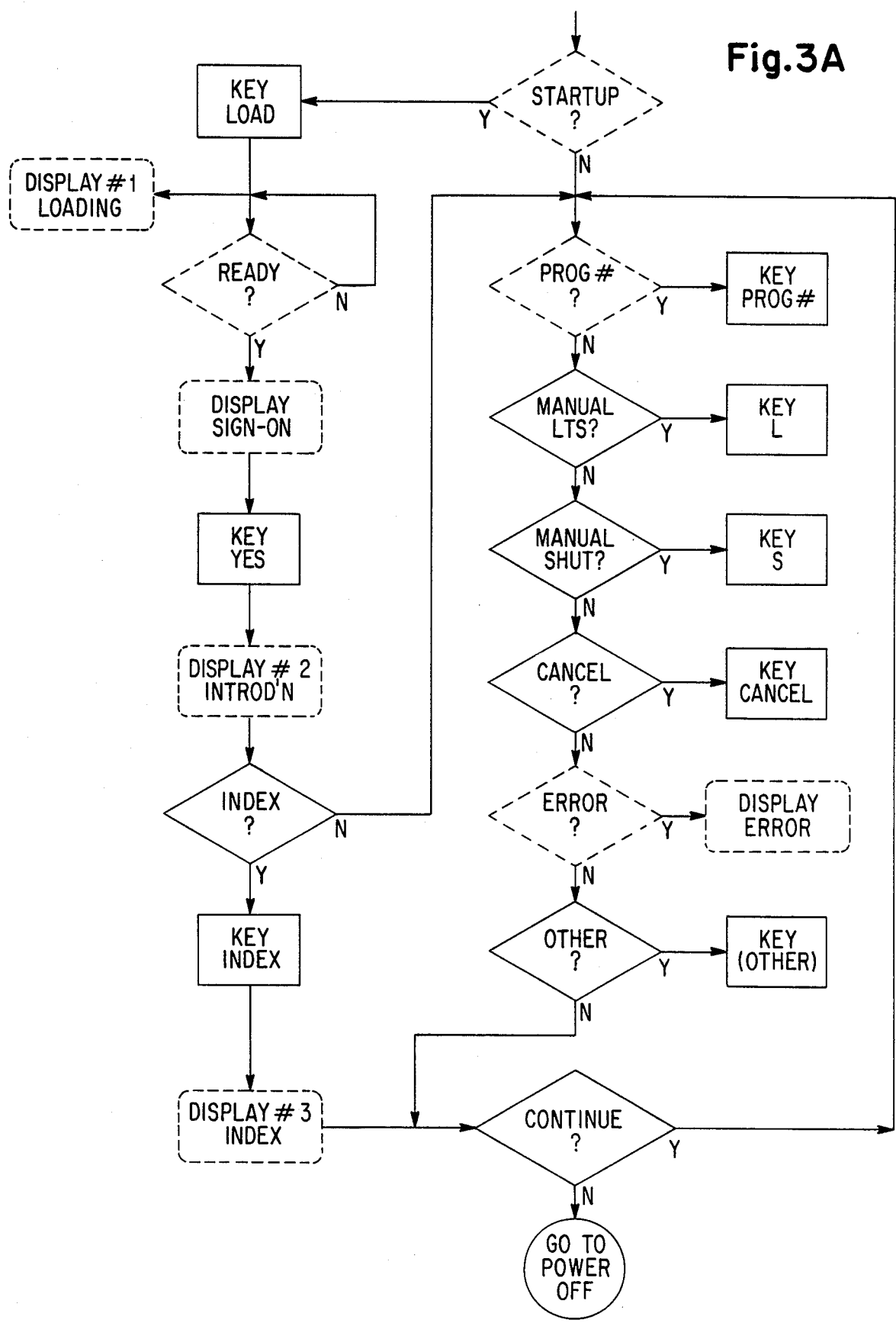
Figure 4:
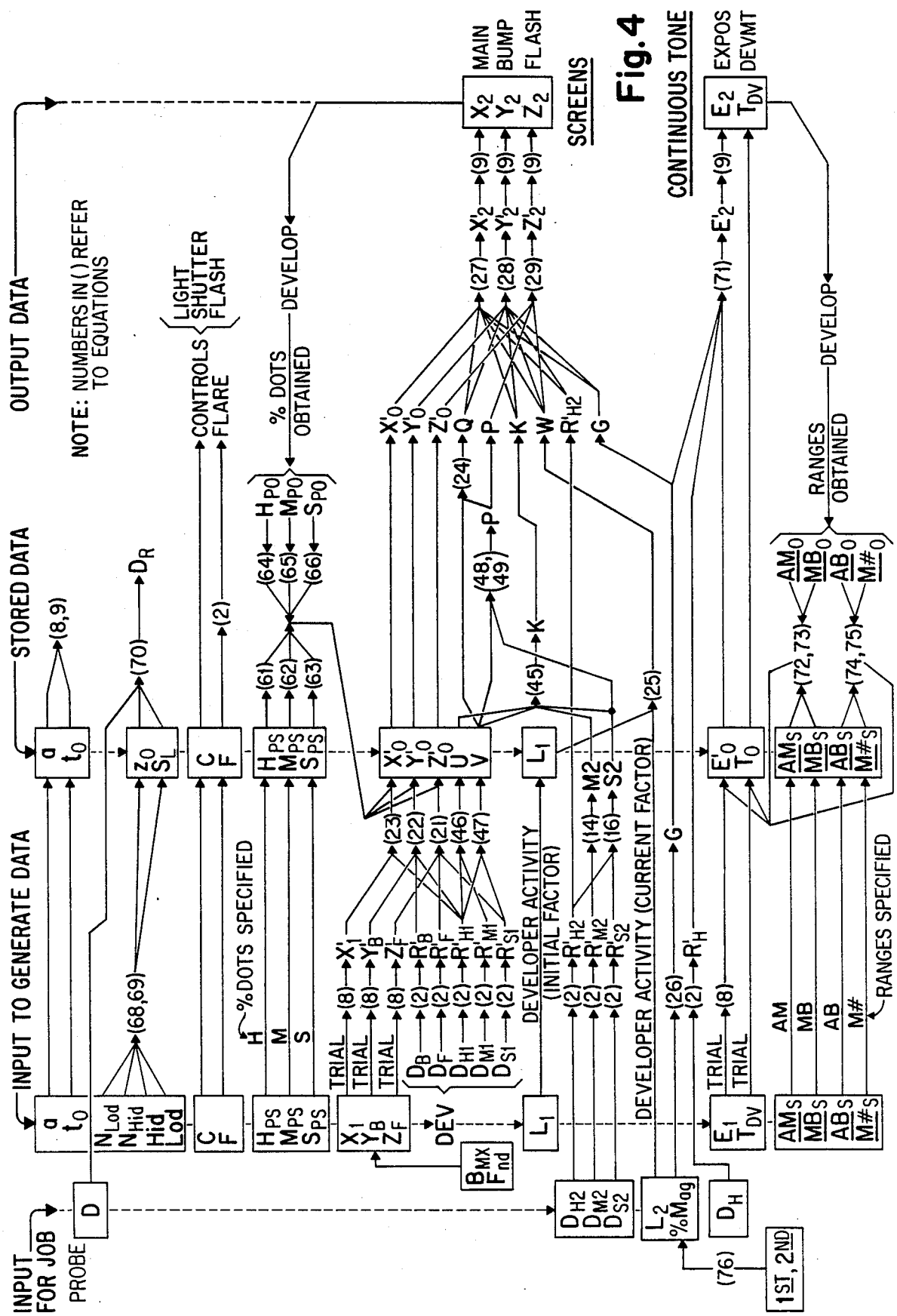
Figure 5A:
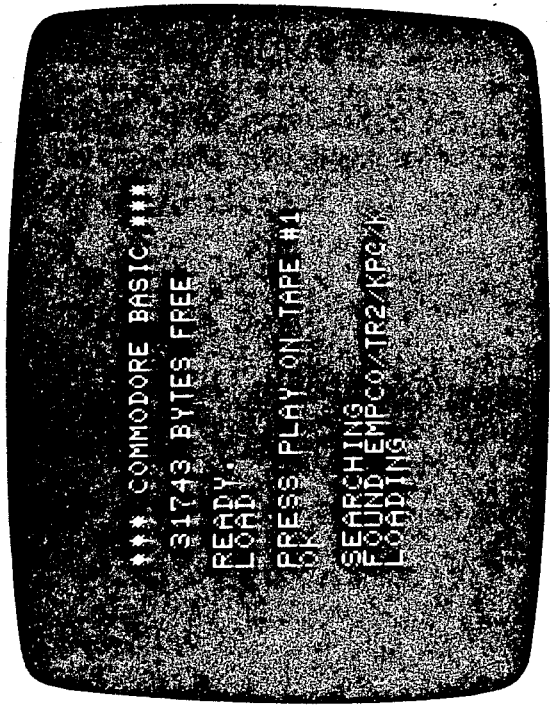
Figure 5A:
Figure 5A:
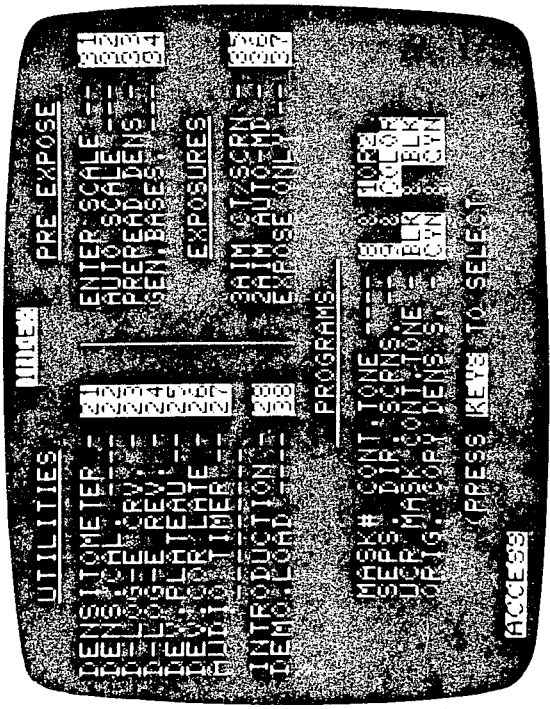
Figure 5A:
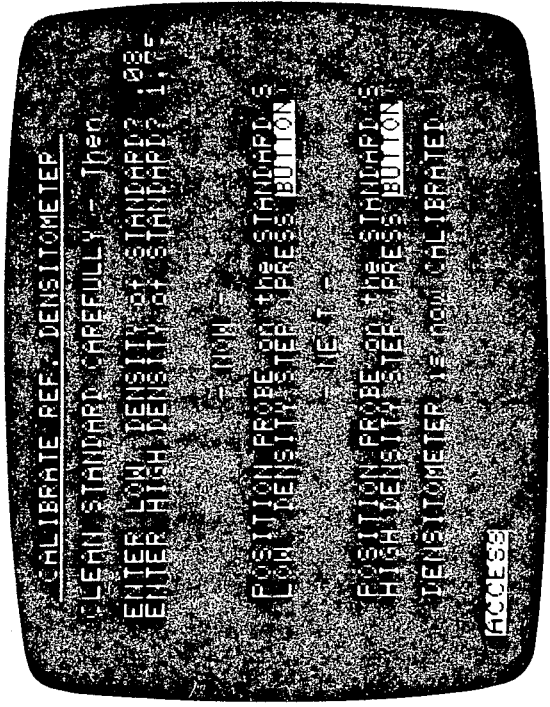

FIGS. 3A, etc., comprises an interrelated set of schematic flow-chart diagrams illustrating numerous decisions (in diamonds) and other steps (in rectangles) performed by human operator (solid outline) or otherwise (dashed outline) as by computer or related apparatus in practice of the invention, as with the apparatus of FIG. 1;

FIG. 4 is a schematic flow sheet for computational steps, here conveniently machine-assisted or performed by computer; and FIGS. 5A, etc., constitute a set of displays to the operator, as on a CRT, including a plurality of the following types: announcements, inquiries, and instructions; numerical results of measurements or calculations; and both tabular and graphical presentations of data.

In general, the objects of the present invention are accomplished, in a preferably densitometrically determined light-integrating system of photographic reproduction control, by interaction between a human operator and an inanimate repository, processor, and displayer of pertinent information also adapted to interrogate and to instruct or coach the operator.

For no-screen work in black and white, given activity and sensitivity data for the developer and the film or paper, the steps include measuring, recording, and displaying density and corresponding percentage of light transmission or reflection at a succession of locations on a standard grey scale, preferably progressing from light to dark, making a test exposure of such standard copy for a trial number of light units and developing it for a trial number of seconds, measuring density and calculating percentage value of light transmission or reflection (of the developed negative or positive, as the case may be) resulting in desired highlight, midtone, and shadow portions thereof, and comparing the measured values with the desired values. Then upon adjustment of exposure light units and development time to equate the actual values resulting therefrom to the desired values, non-standard copy whose highlight control density has been factored in initially is successfully reproduced within an acceptable tolerance range. Color work is similar but involves repetition for one or more color correction masks, as will be understood.

Similarly, for halftone screen work, the steps include making a test main (screened) exposure of the standard for a trial number of light units, making a second test exposure of the standard the same as the first test plus a "bump" (i.e., no-screen) exposure of the copy for a prescribed number of light units, and making a third test exposure of the standard the same as the first plus a "flash" (i.e., screened, no-copy) exposure for a trial number of light units, then after developing the three exposed test strips, locating desired percentage highlight, midtone, and shadow dot values in resulting portions of the first strip, the desired highlight value in the second strip and the desired shadow value in the third strip, measuring the corresponding densities that produced the desired dot values, and calculating basic main, bump, and flash exposures. Subsequent fine tuning adjustments can be made in the respective prescribed base exposures depending on results achieved.

Color separation work here requires repetition of the screened exposure calculations and procedure for each of three color components and black of the copy, separated by suitable filters: e.g., cyan, magenta, yellow, and black. After individual processing the resulting color-correcting masks are utilized together with the copy, as is customary, in completing the color separations, either screened (direct method) or continuous tone (indirect method).

It should be understood that, in proceeding according to the foregoing recitals of this invention, the operator is coached or instructed visually and that results of what the operator does are displayed to the operator either immediately or upon completion of intervening calculations machine-assisted by what may be a general purpose digital computer duly instructed by software furnished beforehand. It would be unduly repetitive to state both an instruction and an action taken pursuant to such instruction, so only the action is stated, and the instruction is to be understood as having been displayed theretofore. Similarly, where appropriate, the results of the actions taken (e.g., densitometer reading) are understood as being displayed immediately thereafter.

FIG. 1 shows diagrammatically procedural interrelationships necessarily or likely to be encountered in the practice of this invention. Centered in the upper part of the drawing are indicated the fundamental procedures of density measurements and of base and constant generation, which affect most of the other procedures. In general, the left half of the diagram relates to halftone reproduction, and the right half to continuous tone (no-screen) reproduction, and various procedures or components contribute to one or the other or to both, as indicated by arrowheads on the interconnecting lines. Thus, compensatory procedures for changes in reproduction scale or in developer activity and for reciprocity failure (non-linearity of actinic effect relative to exposure duration) are applicable to both. While either screened or unscreened procedures may apply to both color and black-and-white reproduction, color work requires one or more contrast-reducing and color-correcting masks in continuous tone to be used to modify the copy characteristics when making the cyan, magents, and yellow, as well as black, continuous tone indirect separations or a corresponding number of direct screen separations. Only a single screen is required for black and white work. Halftone reproduction is characterized by required vignetting dot sizes and may be accomplished by either 3-aim (highlight, midtone, and shadow) or 2-aim (highlight and shadow, with automatic midtone) methods. Fine-tuning adjustment of resulting halftone reproduction can be accomplished by checking the degree of correlation between first-effort reproduction results and such requirements and by appropriately modifying exposures (e.g., main, bump, flash). In continuous tone work, on the other hand, tonal ranges are prescribed, and both exposure (main only) and development time are adjusted in fine-tuning the results.

Figure 2:
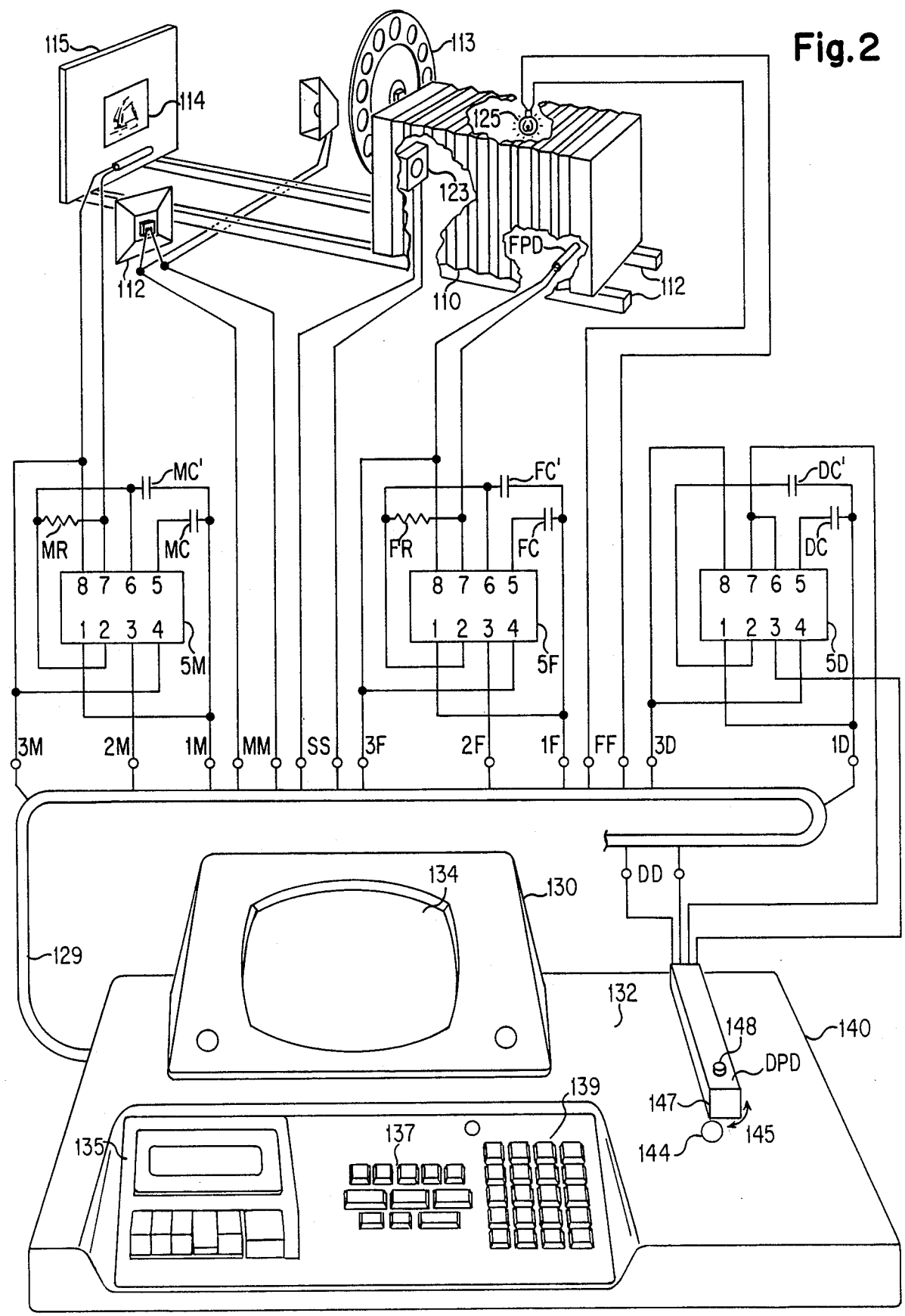
FIG. 2 is a schematic diagram of apparatus used in the practice of this invention.

FIG. 2 shows schematically camera 110 (with extensible bellows) mounted slidably on pair of rails 112 on the far end of which is mounted easel 115 carrying pictorial copy 114. Filter wheel 113, whose positioning is controlled by connection with the computer, carries those filters chosen by the operator to produce the masks and the cyan magenta, yellow, and black separations. Used as described above, it is interposed between the camera and the copy. The easel is illuminated by pair of main lamps or lights 120 (in reflectors), and also supports photodiode PD close to the copy. Pair of leads from the photodiode go to terminals 7 and 8 of integrated circuit chip 5M surrounded by circuitry marked MAIN, being one of three like circuits (the other two being marked FLASH and DENSITOMETER) to be discussed in more detail below. Another pair of leads connect the main lamps to power terminals MM at cable 129. Shown inside the camera is shutter 123 with pair of leads to terminals SS to control admission of light reflected by the copy from lamps 120. Also shown inside the bellows are flash lamp 125 with pair of leads connecting to terminals FF, and photodiode FPD with pair of leads to terminals 7 and 8 of chip 5F. Not shown is a vignetting screen, which is supported (when used) at essentially the focal plane immediately ahead of the film.

Cable 129 in FIG. 2 bundles the various leads and conducts them to general-purpose computer 130, which is shown as comprising (in addition to conventional internal circuitry, not shown) housing 132, cathode-ray tube (CRT) 134 supported thereon, cassette player 135 (with controls) at the left of a keyboard having key group 137 in the center and key group 139 at the right. Located to the right of the computer is densitometer 140 comprising stage 142 with field illumination opening 144 therein, and densitometer arm 145 (with manual button 148) hinged thereover for movement up and down (as suggested by a two-headed arrow) and biased in the upward position. Not shown but in broken lines inside the arm are lamp DL, with a pair of leads to terminals DD near the end of the cable, and photodiode DPD, which has a pair of leads connecting it to terminals 7 and 8 of chip 5D.

Each of the integrated circuits chips (5M, 5F), being similarly connected with like parts in a circuit like the others, operates in like manner, both chips being of 555 type. Each chip is connected as a monostable charge-discharge device whose flip-flop periodicity is determined by its RC time constant, the capacitance being fixed by the principal capacitor (MC or FC) and the resistance being that of the corresponding photodiode (PD or FPD). Each repetition or flip of the monostable flip-flop actuates iterative counter-relay means (not separately shown) in the computer, decrementing its count (from a preset value, which corresponds to the desired number of exposure units, to 0) as long as light is incident onto the corresponding photodiode. The associated relay contacts complete the energizing circuit (not shown) to the illumination means through contact pairs MM or FF (as the case may be) until zero is reached after the predetermined count, whereupon the light is deenergized by the relay.

Figure 3B:
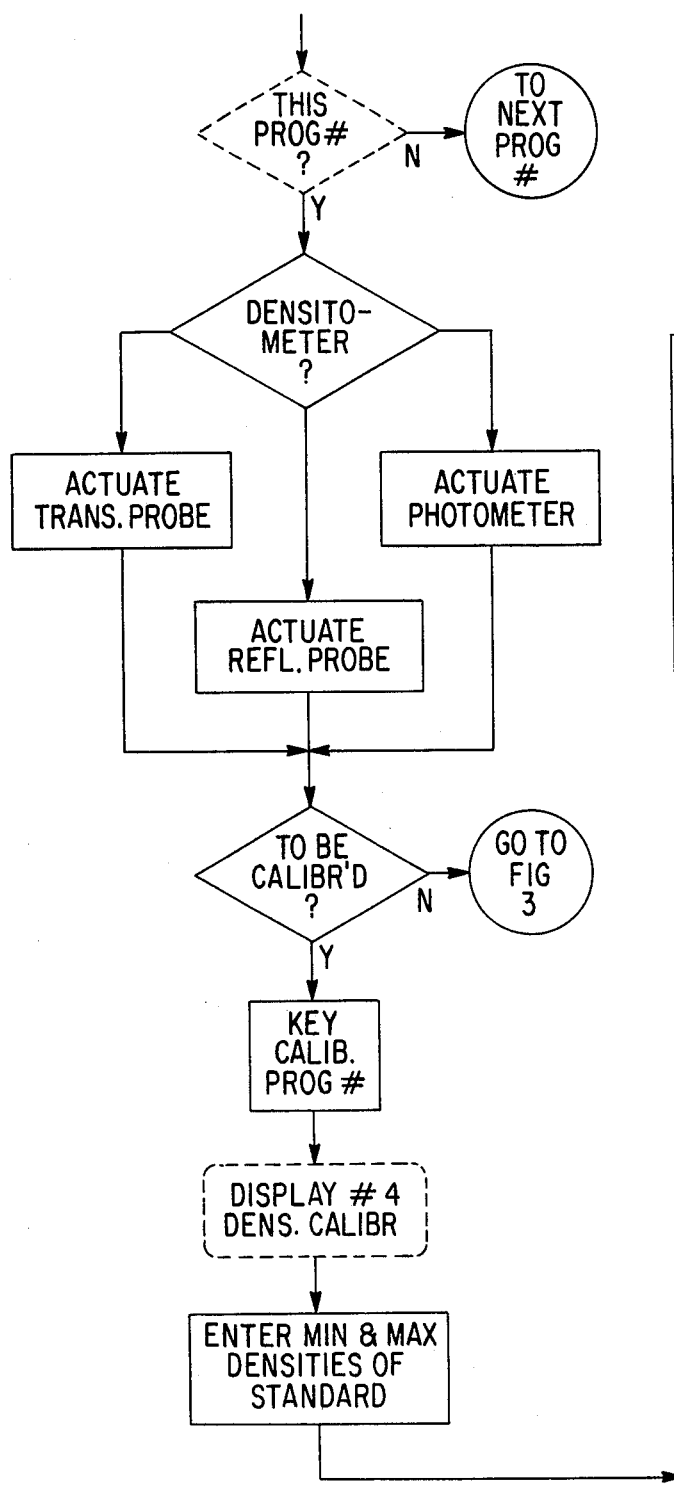
Figure 3B:
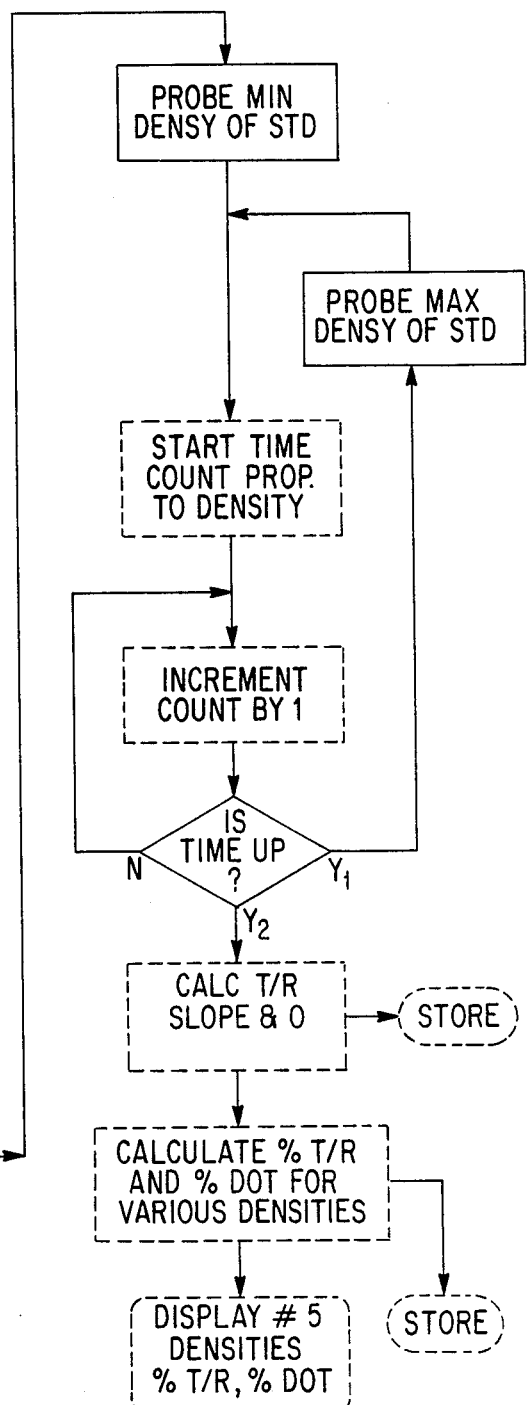

FIGS. 3A and 3B show in flow-chart form procedures to be utilized in the practice of this invention. To distinguish between decisions or operations performed by the human operator and those performed by the computer or associated apparatus, the blocks for the operator are outlined in solid lines and those for the apparatus in broken or dashed lines.

FIG. 3A shows basic startup and related action paths. The diamond captioned STARTUP? represents a decision point for the operator (hence outlined in solid); if so, the operator should key LOAD (solid outline), whereupon the software is loaded into the computer memory. (For simplicity, the cassette controls are omitted here.) Loading DISPLAY #1 appears (FIG. 5A-1) until a READY? decision is determined affirmatively by the computer, when a title or sign-on display appears (contents not shown). These last few items, being operator-free, have dashed outlines. The operator is instructed by the display to key YES to continue, whereupon an introduction, DISPLAY #2, appears (FIG. 5A-2). At this point the operator may choose to see an index by keying INDEX, whereupon similarly entitled DISPLAY #3 appears (FIG. 5A-3); or the operator may select a program number by keying the appropriate number shown in the INDEX (possibly already known to the operator). The same choice is presented if not a start-up. In either event, the desired program is keyed numerically, selected regardless of other possible caption (e.g., UTILITIES) in the INDEX itself. However, if the operator does not desire to follow a numbered program, other choices ensue. Examples are manual control of lights and shutter, and cancellation of data (not pertinent at startup), display of error messages as chosen by the computer rather than the operator, who also may key other non-program selections (e.g., WRITE DATA, READ DATA). Otherwise the operator may decide to continue or not, as indicated.

FIG. 3B shows one program: DENSITOMETER. After the computer determines whether this number of program has been selected, the operator must select a specific mode of density measurement: TRANSMISSION, REFLECTION, or PHOTOMETER and then must activate the corresponding piece of equipment. In general, film requires the first; print medium the second; and light calibration the third. The next decision is whether the densitometer has been calibrated or not. If it has been the operator may proceed directly to use the densitometer as in FIG. 3C. If not, the operator keys the program number shown in the index to calibrate the densitometer, whereupon DISPLAY #4 (FIG. 5A-4) appears. If the operator attempts to bypass the calibration procedure altogether the computer will display an error message, and the densitometer cannot be used until the calibration has been accomplished.

Figure 5B:
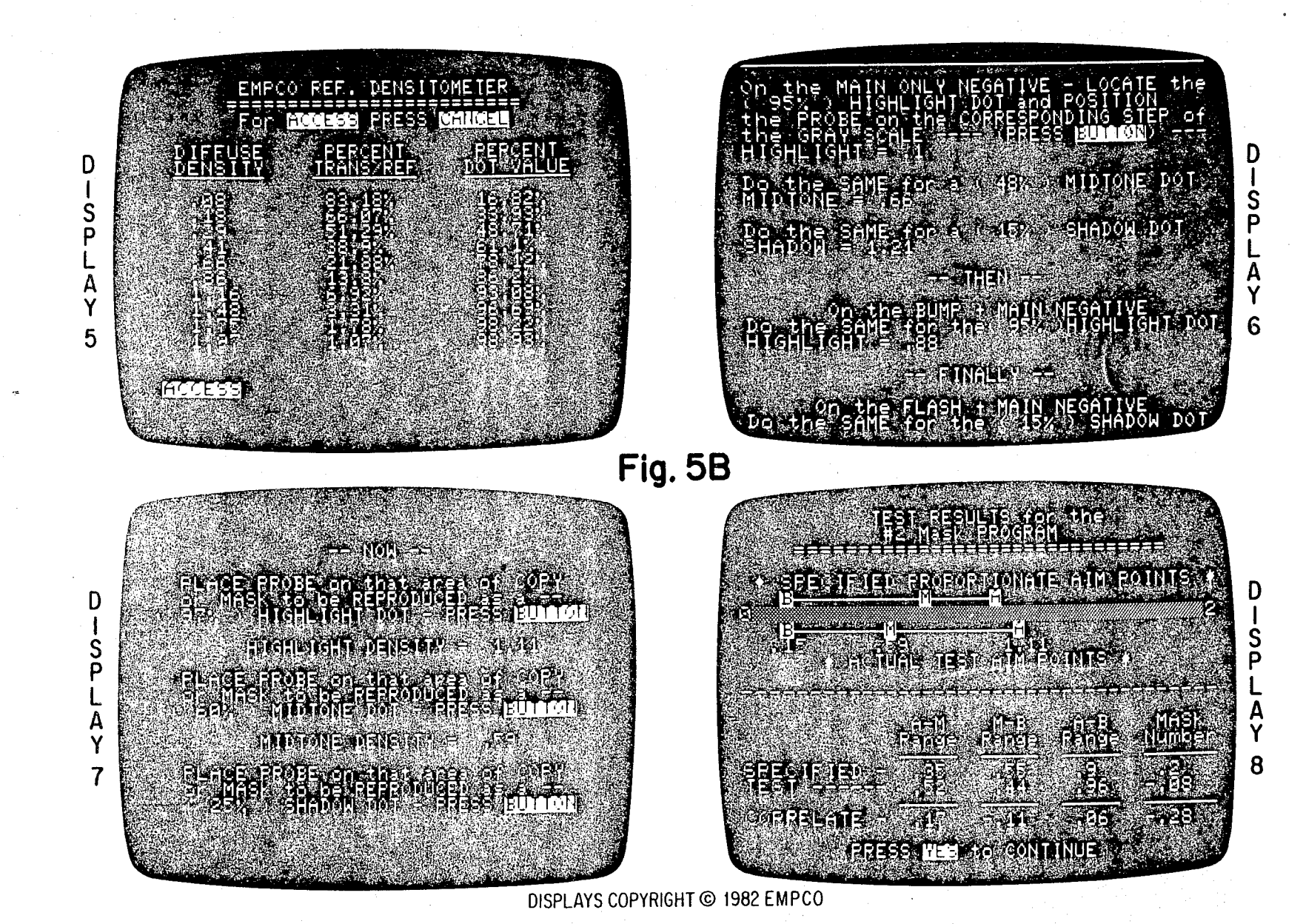

As shown further in FIG. 3B, the operator then enters the specified minimum density of the density standard being used, and then the maximum density of that standard. Both values are stored in the computer memory and appear in the display as they are entered. As instructed by the display, the operator then probes (i.e., juxtaposes the densitometer probe to) the minimum density of the standard and presses the probe button so as to start the density measurement. A counter in the computer counts incrementally from the start to the end of a time base (generated by IC chip 5D, also a 555 type) determined by the light flux received, as a numerical measure of the density. This is repeated for the maximum density of the standard. As the response of the densitometer is essentially linear, it is now calibrated, and the computer solves for the resulting slope and zero intecept; it also calculates and displays in DISPLAY #5 (FIG. 5B-1) corresponding density, percent transmission or reflection, and percent halftone dot for the measured values, and other values on the linear response curve, all of which are also stored for future use.

Figure 3C:
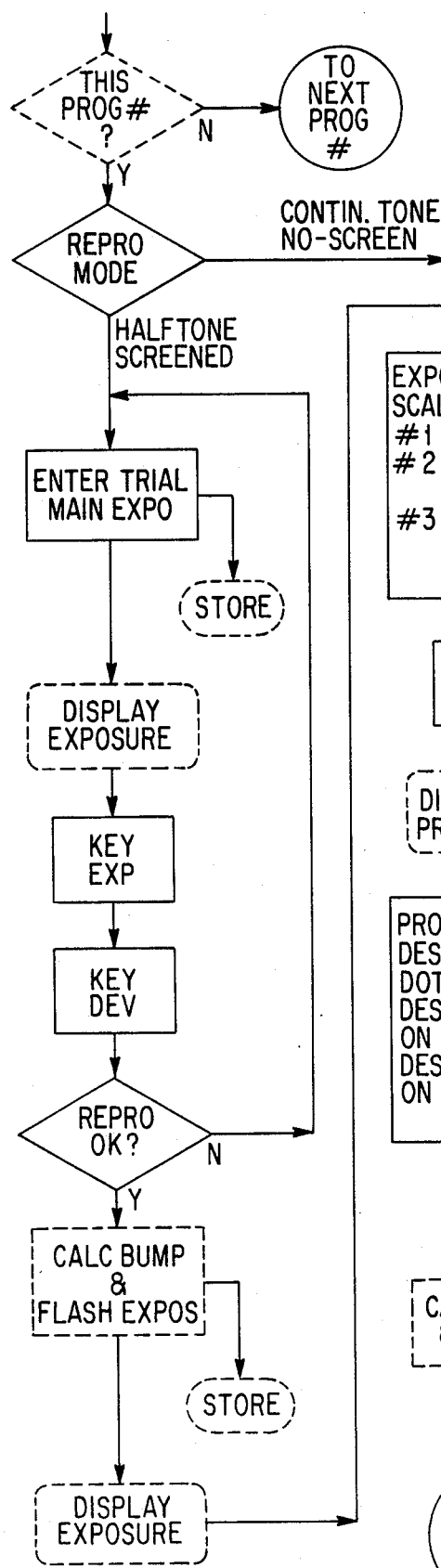
Figure 3C:
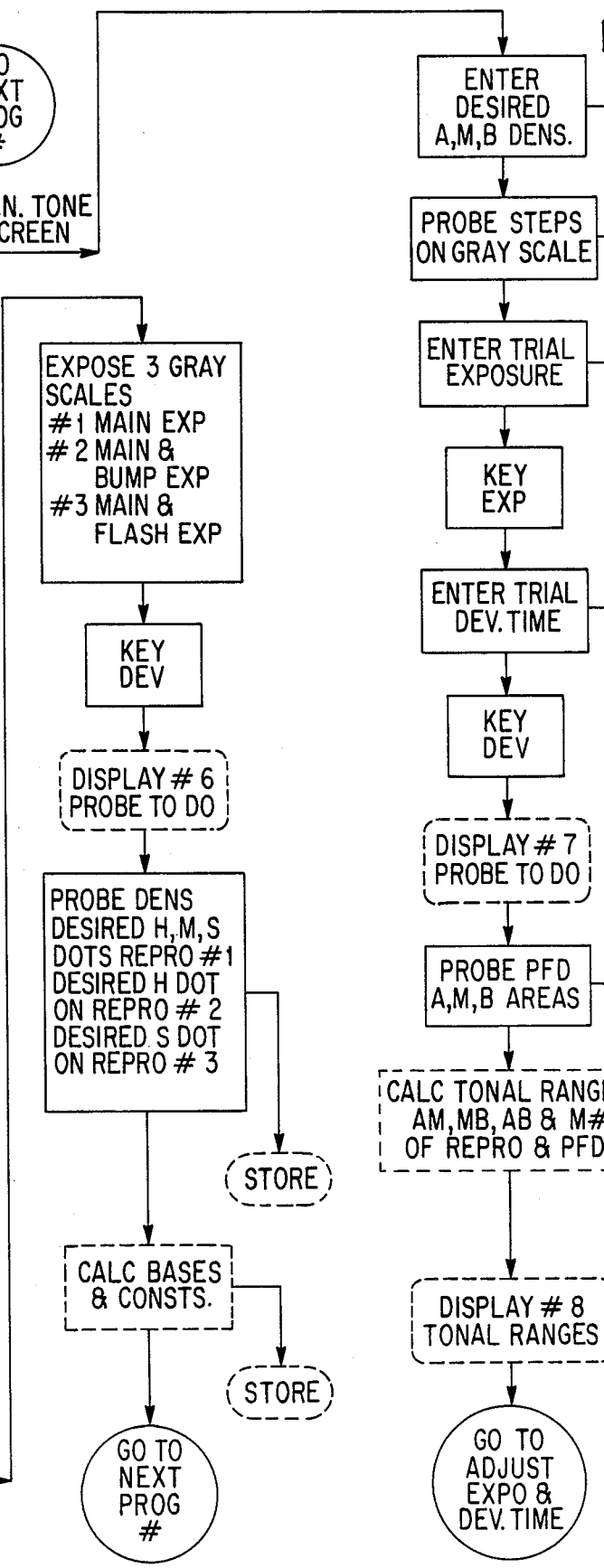

FIG. 3C shows use of the (calibrated) densitometer to generate bases and constants for use in subsequent calculations and programs. The left or the right side of this diagram is followed, depending upon whether the operator is using a halftone screen or a continuous tone no-screen process. In the halftone procedure the operator aided by experience or external instruction selects and keys in a trial main exposure expressed in number of exposure units. The selected number is displayed so that the operator can see whether it was entered correctly. Then the operator depresses the EXPOSE key; lights 120 illuminate the copy, and shutter 123 opens. Then the computer integrates the applied light flux and counts down to zero, terminating the exposure as soon as the selected number of units has been received. The procedure for doing so has been described in my mentioned patents as supplemented or updated by the described apparatus of present FIG. 2. The exposed film is developed, and the resulting photographic reproduction is checked by the operator; a print can be made to aid in the checking. If the result is not even close, another trial exposure is selected and completed by the operator until the result is close; this determines a basic main exposure.

With the basic main exposure selected, the computer calculates trial bump exposures, and the operator exposes three graduated gray-scale standards (at least 15 steps): one for the main exposure, one for the main plus bump exposures, and one for the main plus flash exposures. (Like the main only, the flash has to be determined by trial.) These are developed in like manner. Then following instructions given by computer DISPLAY #6 (FIG. 5B-2) the operator locates and probes desired highlight, midtone, and shadow dot values in the first one, the desired highlight value in the second one, and the desired shadow value in the third one. Corresponding percentage dot values are calculated and stored in the computer, which also calculates related bases and constants for subsequent use. It should be noted that in color work, once the cyan bases have been generated in this manner the computer has enough data so that test main plus bump and main plus flash are not required for the other colors; main exposure only is required on each color except cyan.

In the no-screen procedure, on the other hand, the operator enters a trial exposure of the copy to be reproduced, exposes it, enters a trial development time, and develops it. The operator, following instructions received in computer DISPLAY #7 (FIG. 5B-3), probes highlight, midtone, and shadow areas of the resulting reproduction. The computer calculates the tonal ranges: AM, MB, AB, and M# as desired and as in the resulting reproduction, whereupon they are shown both numerically and graphically in DISPLAY #8 (FIG. 5B-4) together with the respective differences. Using them the computer will automatically adjust exposure and development time to adjust the resulting values to the desired values.

FIG. 4 presents schematically the computational flow of data in order to enable the computer to complete the often very complex calculations in the various programs or procedures. Useful equations, solvable in customary manner by the computer, appear in the cited Archer papers and are designated there by the following numbers: 1 to 9, 46, 47, 14, 15, 16, 45, 48, 49, and 21 to 29. The numbers presented out of order here are in the second Archer paper as improvements upon lower numbered ones in the first paper.

Supplemented with equations devised by the present inventor (numbered from 58 upward) the cited equations are reproduced in Table 1 below. The symbols used therein—whether as constants, variables, or merely subscripts, for example—are presented in Table 2, which follows Table 1, and are provided in that second table with a cross-index to the equations in which they appear and a recital of their respective meanings.

TABLE 1
EQUATIONS

| Eq. No. | |
|---|---|
| 1 | $R = 10^{-D}$ |
| 2 | $R' = 10^{-D} + F$ |
| 3 | $E = It$ |
| 4 | $E_c = eIt$ |
| 5 | $\text{Log } e = -a(\text{Log } t - \text{Log } t_o)^2$ |
| 6 | $t' = et$ |
| 7 | $E_c = It'$ |
| 8 | $\text{Log } t' = \text{Log } t - a(\text{Log } t - \text{Log } t_o)^2$ |
| 9 | $\text{Log } t = [a\text{Log } t_o + \frac{1}{2} - (-\frac{1}{4} + a\text{Log } t_o - a\text{Log } t')^{\frac{1}{2}}]/a$ |
| 46 | $U = R_{M1}'/(R_{H1}' - R_{M1}')$ |
| 47 | $V = R_{S1}'/(R_{H1}' - R_{S1}')$ |
| 13 | $M1 = R_{M1}'/R_{H1}'$ |
| 14 | $M2 = R_{M2}'/R_{H2}'$ |
| 15 | $S1 = R_{S1}'/R_{H1}'$ |
| 16 | $S2 = R_{S2}'/R_{H2}'$ |
| 45 | $K = [U(1 - M2) - V(1 - S2)]/(M2 - S2)$ |
| 48 | $P = (1 - A)/(1 - S1 \cdot A)$ |
| 49 | $A = S2(K/V + 1)$ |
| 21 | $Z_o' = Z_F R_{S1}'/(R_{S1}' - R_F')$ |
| 22 | $Y_o' = Y_B'R_B'R_{H1}' (R_{H1}' - R_B')$ |
| 23 | $X_o' = X_1'R_{H1}'$ |
| 24 | $Q = 1 - P \cdot S1$ |
| 25 | $W = 10^{(L1 - L2)}$ |
| 26 | $G = [(\% \text{ Mag}/100) + 1]^2/4$ |
| 27 | $X_2' = (KX_o'QWG)/R_{H2}'$ |
| 28 | $Y_2' = [(1 - K)Y_o'QWG]/R_{H2}'$ |
| 29 | $Z_2' = PZ_o'W$ |
| 58 | $y = a_o + a_1 + a_2x^2$ |
| 59 | $x = \text{Log } t$ |
| 60 | $\text{Log } t_o = a_1/ - 2a_2$ |
| 61 | $H_C = H_{PO} - H_{PS}$ |
| 62 | $M_C = M_{PO} - M_{PS}$ |
| 63 | $S_C = S_{PO} - S_{PS}$ |
| 64 | $_oX_o' = X_o'H_{PS}/H_{PO}$ |
| 65 | $_oY_o' = Y_o'H_{PS}/H_{PO}$ |
| 66 | $_oZ_o' = Z_o'S_{PS}/S_{PO}$ |
| 67 | $Y_B = X_1(B_{MX}/100)10^{Fnd}$ |
| 68 | $S_L = \text{Log}(10^{Hid}/10^{Lod})/\text{Log}(N_{Hid}/N_{Lod})$ |
| 69 | $z_o = (N_{Lod})^{SL}/10^{DLod}$ |
| 70 | $D_R = D_C^{SL}/Z_o$ |
| 71 | $E_2' = E_o'R_H'G$ |
| 72 | $_oE_o' = E_o' \cdot 2^{J1/(MB_o - MB_s)}$ |
| 73 | $_oT_{DV} = T_{DV} \cdot 2^{J2/(AM_o - AM_s)}$ |
| 74 | $_oE_o' = E_o' \cdot 2^{J1/(M\#_o - AB_o + AB_s)}$ |
| 75 | $_oT_{DV} = T_{DV} \cdot 2^{J2/(AB_o - AB_s)}$ |
| 76 | % Mag = 2nd/1st |
| 77 | $\text{In} = (c - c_o)/(c_1 - c_o)$ |

TABLE 2
LEGEND

| Symbol | Equation(s) | Meaning |
|---|---|---|
| a | 5,8,9 | Coefficient of $x^2$ in simple parabolic equation |
| $a_o$ | 58 | Constant first term in quadratic expansion |
| $a_1$ | 58,60 | Coefficient of x in second term of quadratic expansion |
| $a_2$ | 58,60 | Coefficient of $x^2$ in third term of quadratic expansion |
| A | 48,49 | Consolidated variable in flash factor (P) equations |
| $AB_o$ | 74,75 | Obtained highlight-shadow density range (cont. tone) |
| $AB_s$ | 74,75 | Specified ditto |
| $AM_o$ | 73 | Obtained highlight-midtone density range (cont. tone) |
| $AM_s$ | 73 | Specified ditto |
| B | 67 | Bump (no-screen) |
| c | 77 | Count per unit length on dimensional scale time base |
| $c_o$ | 77 | Count at zero length on same time base |
| $c_1$ | 77 | Count at one unit length (e.g., inch) on ditto |
| D | 1,2 | Density (optical) |
| $D_C$ | 70 | Densitometer time base count |
| $D_R$ | 70 | Resulting or output density (probed) |
| DV | 73,75 | Developer (subscript) |
| e | 4,5,6 | Efficiency factor in calcns. with reciprocity failure |
| E | 3 | Exposure (illuminance or time) |
| $E_o$ | 71,72,74 | Exposure (first or trial) |
| $_oE_o$ | 72,74 | Exposure (2nd or adjusted) |
| $E_2$ | 71 | Exposure (contin. tone) |
| $E_c$ | 4,7 | Exposure at critical density |
| F | 2 | Flare (camera aberration) |
| Fnd | 67 | Neutral density filter (subscript) |
| G | 26,27,28,71 | Image brightness at focal plane of camera |
| H | 61,64,65 | Highlight control region |
| H1 | 46,47,15,22,23,71 | Highlight dot (subscript) from main test exposure |
| H2 | 14,16,27,28 | Highlight dot specified (subscript) |
| $H_C$ | 61 | Closeness of obtained to specified highlight % dot |
| Hid | 68 | High density of calibration standard (also subscript) |
| I | 3,4,7 | Illuminance (light flux) |
| In | 77 | Inches |
| J1 | 72,74 | Empirical exposure constant for given film & developer |
| J2 | 73,75 | Empirical development const. for given film & developer |
| K | 45,49,27,28 | Control factor (for main and bump exposures) |
| L1 | 25 | Developer activity factor (from test or trial expos.) |
| L2 | 25 | Developer activity factor (at production run) |
| Lod | 68,69 | Low density of calibration standard (also subscript) |
| Log | 5,8,9,59,60,68 | Common (base 10) logarithm |
| M | 62 | Midtone control region |
| M1 | 46,47,14 | Midtone dot (subscript) from main test exposure |
| M2 | 14,45 | Midtone dot specified (subscript) |
| $M\#_o$ | 74 | Mask number range (AM-MB) obtained (contin. tone) |
| $MB_o$ | 72 | Obtained midtone-shadow density range (contin. tone) |
| $MB_s$ | 72 | Specified ditto |
| $M_C$ | 62 | Closeness of obtained to specified midtone dot |

TABLE 2-continued
LEGEND

| Symbol | Equation(s) | Meaning |
|---|---|---|
| MX | 67 | Maximum (subscript) |
| N | 68,69 | Count on light-controlled time base |
| P | 48,24,29 | Flash factor (basic flash) |
| PO | 61,62,63,64,65,66 | Percentage dot obtained |
| PS | 61,62,63,64,65,66 | Percentage dot specified |
| Q | 24,27,28 | Flash compensation factor for main & bump exposure |
| R | 1,2,46,47,14,15, 16,21,22,23,27, 28,71 | Reflectance (or transmittance) |
| $R_B'$ | 22 | Effective reflectance for specified % dot (main & B) |
| $R_F'$ | 21 | Effective reflectance for speed % dot (main & flash) |
| S | 63,66 | Shadow control region |
| S1 | 47,15,48,21,24 | Shadow dot (subscript) from main test exposure |
| S2 | 16,45,49 | Shadow dot specified (subscript) |
| $S_C$ | 63 | Closeness of obtained to specified shadow % dot |
| $S_L$ | 68,69,70 | Slope in calibration of densitometer |
| t | 3,4,5,6,7,8,9, 59 | Time (exposure) |
| $t_o$ | 5,8,9,60 | Time (at maximum speed on reciprocity failure curve |
| T | 73,75 | First or trial exposure time (with DV subscript) |
| $_oT$ | 73,75 | Adjusted exposure time (with DV subscript) |
| U | 46,45 | Midscreen range (ratio of reflectances producing specified H to M dots |
| V | 47,45,49 | Full screen range (ratio of reflectances producing specified H to S dots |
| W | 25,27,28,29,71 | Developer activity in terms of density shift |
| x | 58,59 | Abscissa of correction curve for reciprocity failure |
| $X_o$ | 23,27,64 | Main exposure (real terms) |
| $_oX_o$ | 64 | Adjusted main exposure |
| $X_1$ | 23,67 | Main exposure (test or trial) |
| $X_2$ | 27 | Main exposure output (real) |
| Y | 58 | Ordinate of correcn curve for reciprocity failure |
| $Y_o$ | 22,28,65 | Bump exposure (real terms) |
| $_oY_o$ | 65 | Adjusted bump exposure |
| $Y_2$ | 28 | Bump exposure output (real) |
| $Y_B$ | 22,67 | Bump exposure (test or trial) |
| $z_o$ | 69,70 | Ordinate axis intercept in calibration of densitometer |
| $Z_o$ | 21,29,66,69,70 | Flash exposure (real terms) |
| $_oZ_o$ | 66 | Adjusted flash expos. (real) |
| $Z_2$ | 29 | Flash exposure output (real) |
| $Z_F$ | 21 | Flash expos. (test or trial) |
| 1st | 76 | Copy dimension (original or first) |
| 2nd | 76 | Specified dimension (second or as to be in reproduction) |
| % Mag | 26,76 | Magnification ratio (in %) |
| In Mag | 77 | Magnification ratio |
| prime (') | 2,6,7,8,9,46,47, 14,15,16,21,22,23, 27,28,29,64,65,66, 71,72,74 | Denotes "effective" values (adjusted to compensate for reciprocity failure) |

It will be understood that the computer is to be provided with the information in these tables so that when appropriate data values are present in the computer's memory for the necessary independent variable(s), whether keyed in numerically or resulting from some measurement or calculated from one or more of the foregoing, the computer can solve for the value(s) of desired dependent variable(s).

Primed versions of variables in the foregoing tables differ from the corresponding unprimed ones by appropriate correction for reciprocity failure, which in some instances or for some purposes might be negligible or at least neglected. As indicated by Archer, equation 8 enables a real exposure time such as a test exposure to be converted into "effective" time for the purpose of calculation, whereupon changes in exposure time arising from changes in copy density, etc. are made, after which equation 9 prescribes reconversion into real time. Such conversion and reconversion are required only when it is deemed advisable to correct for reciprocity failure, as is customary for the finest reproduction.

FIG. 4 shows data input and flow and the application of equations (numbered parenthetically) for data processing by the computer. General rules of mathematical computation are already available in basic data processing instructions for general purpose computers and need no further mention here. Solution for the variables used here is accomplished in such manner as and when required. As clearly shown, where solid arrows funnel in together at the right of this diagram, the chief outputs are few in number: (1) for halftone screened reproduction, main exposure, bump exposure, and flash exposure; and (2) for no-screen continuous tone reproduction, only one exposure, and development time. The many bases, constants, and data values indicated at the left are combined in various computations to produce values of such outputs, which the equipment utilizes as directed by the operator to effect the desired photographic reproductions. The vertical broken arrows merely group inputs from respective sources or procedures, and outputs.

Thus, the column at the far left includes job input densities, developer activity factors, and magnifications. The next column lists various data-generating inputs including densitometer calibration, coded controls for physical features, flare, specified percentage dot sizes for screened work and specified density ranges for continuous tone work; also developer factors, times, and (offset to the right) densities resulting in developed negatives after trial exposures; and related filter and exposure data. The third principal column comprises some of the data items from the left and data computed by application of the noted equations (numbered parenthetically) to such data items, including reciprocity constants, densitometer calibration constants, and calculated base exposures. The column at the far right includes real main, bump, and flash exposures for screened work and the single exposure and related development time for continuous tone work. Derivation of these two respective types of outcome are explained separately below.

In the first case, the operator designates desired percentage dot sizes for highlight, midtone, and shadow regions ($H_{PS}$, $M_{PS}$, $S_{PS}$). Then the operator effects trial main exposure $X_1$, trial pump exposure $Y_B$ (determined therefrom and from the operator's neutral density filter and maximum limitation on bump exposure to preclude dot degeneration), and trial flash exposure $Z_F$ of given film. Separate negatives exposed for the main exposure, for the main plus bump exposure, and for main plus flash exposure are developed and are probed (i.e., their densities measured) in highlight, midtone, and shadow areas (giving $D_{H1}$, $D_{M1}$, and of the main plus flash (giving $D_F$) where the desired percentage dot sizes have been produced. Application of equation 2 to the exposures and of equation 8 to the probed densities of the resulting negatives give corresponding effective exposures and reflectances, as indicated by respective horizontal arrows. Other arrows (many of them oblique) indicate combinations that produce effective base exposures and determine density ranges of the screen used: thus, $X_1'$ and $R_{H1}'$ give effective base main exposure $X_0'$ via equation 23; $Y_b'$ and $R_{H1}'$ and $R_B'$ give effective base bump exposure $Y_0'$ via equation 22; $Z_F'$ and $R_{S1}'$ and $R_F'$ give effective base flash exposure $Z_0'$ via equation 21. Probed densities copy regions in which the operator wants to produce the specified dots give effective reflectances similarly, whereupon $R_{H2}'$ and $R_{M2}'$ give the required copy midscreen range M2 via equation 14, and $R_{M2}'$ and $R_{S2}'$ give the required copy full screen range S2 via equation 16.

Intermediate variables U and V, measures of screen midtone range and full range, respectively, are obtained via equations 46 and 47 and are combined with M2 and S2 via equation 45 to produce exposure factor K, which is processed further with S2 and S1 directly and through V via equations 48 and 49 to give factor P, which in turn combines with S1 via equation 24 to give factor Q. Developer activity factor W and magnification factor G (obtained as indicated) join these factors and $R_{H2}'$ (previously obtained) with the effective base exposures (shown again in the factors column) to produce factored effective exposures: main $X_2'$, bump $Y_2'$, and flash $Z_2'$ from which real main, bump, and flash exposures ($X_2$, $Y_2$, and $Z_2$) result via equation 9. Comparison of percentage dots obtained in a reproduction so exposed with the specified percentage dots via equation 19 enables the stored effective base exposures to be adjusted in a subsequent reproduction effort to produce better agreement between the specified and the observed dot sizes.

In continuous tone work, on the other hand, the density $D_H$ of a preferred highlight area of the copy to be reproduced is probed and is converted to effective reflectance $R_H'$ by equation 2. The operator selects a trial exposure $E_1$, which is converted to an effective exposure by equation 8. Combination of these values with one another and with the magnification factor via equation 71 gives actual exposure $E_2$ upon reconversion to real quantities by equation 9. The operator exposes standard copy, such as multi-step grey scale for such exposure and develops the resulting negative for the selected development time. The operator then compares density values resulting in the desired highlight, midtone, and shadow regions thereof against desired or preferred density ranges previously specified by the operator: AM and MB for continuous tone separations, AB, and M# (=MB-AM) for color correction masks. Appropriate adjustment of the exposure and the development time (by equations 72 and 73 for separations, or equations 74 and 75 for masks) should enable the non-standard copy to be reproduced likewise with density ranges matching those specified, within an acceptable tolerance range.

It is apparent from the complexity of the equations in Table 1 and the data flow in FIG. 4 that a human operator would have great difficulty and consume inordinate amounts of time in attempting to duplicate the procedures of this invention unaided by computational assistance. The likelihood of human error would be substantial, whereas the computer operates error-free in performing such mathematical (and logical) computation.

Although a preferred embodiment of the present invention has been shown and described, one or more modifications also have been suggested above. Other modifications may be made, as by addition, combination, or division of parts or steps, while retaining at least some of the advantages or benefits of the invention, which is defined only in the following claims.

The claimed invention:

1. In a computer-assisted system of photographic reproduction, wherein a human operator causes densitometric and related data to be supplied to apparatus adapted to process such data and to determine exposures therefrom, the improvement comprising retrievably storing and displaying some such data and related information derived therefrom to the operator at selected steps in the overall data processing and exposure determination procedure, wherein densitometric data from calibration of densitometer response against a standardized grey scale and densitometric data subsequently obtained from non-standard copy are displayed to the operator upon demand, whereas exposure data for such copy calculated from densitometric data so obtained are displayed to the operator automatically 2. Photographic reproduction system according to claim 1, including providing the operator with a choice of operational procedures from which to select.

3. Photographic reproduction system according to claim 2, wherein such operational procedures include densitometer calibration and generation of bases and constants for use in determination of exposures.

4. Photographic reproduction system according to claim 2, including displaying to the operator instructions to be followed by the operator in performing a selected operational procedure.

5. Photographic reproduction system according to claim 4, wherein the operator is so instructed to juxtapose the densitometer to successive portions of copy and take a density reading therewith.

6. Photographic reproduction system according to claim 4, wherein the operator is so instructed to perform a trial exposure, development, and one or more densitometric measurements on the resulting copy reproduction.

7. Photographic reproduction system according to claim 6, wherein the apparatus determines appropriate exposures from the resulting densitometer data and pertinent mathematical relationships and displays such exposure information to the operator.

8. In a light integrating system of photographic exposure control, wherein a human operator causes densitometric data to be supplied to apparatus adapted to store retrievably and to process such data and to determine exposures therefrom with the aid of related data about the photographic characteristics of the material to be exposed, the improvement comprising so supplying and retrievably storing such data, also supplying to and retrievably storing in such apparatus linstructions for the operator to follow in providing such densitometric data.

9. Exposure control system according to claim 8, including supplying and retrievably storing instructions for automated processing of stored data to determine proper exposures, and instructions for displaying to the operator such data and instructions and exposure data derived therefrom.

10. Exposure control system according to claim 8, including retrievably storing densitometric data for desired highlight, midtone, and shadow portions of non-standard copy to be photographed for reproduction.

11. Exposure control system according to claim 10, wherein continuous-tone no-screen reproduction is being performed, and including the steps of measuring, storing retrievably, and displaying density and corresponding percentage of light transmission or reflection at a succession of locations on a standard grey scale, preferably progressing from light to dark, making a test exposure of such standard copy for a trial number of light units and developing it for a trial number of seconds, measuring density and calculating percentage value of light transmission or reflection (of the developed negative or positive, as the case may be) resulting in desired highlight, midtone, and shadow portions thereof, and comparing the resulting values with the desired values.

12. Exposure control system according to claim 10, wherein halftone screened reproduction is being performed, and including the steps of making a test main (screened) exposure of the standard for a trial number of light units, making a second test exposure of the standard the same as the first test plus a "bump" (i.e., no-screen) exposure of the copy for a prescribed number of light units, and making a third test exposure of the standard the same as the first plus a "flash" (i.e., screened, no-copy) exposure for a trial number of light units, then after developing the three exposed test strips, locating desired percentage highlight, midtone, and shadow dot values in resulting portions of the first strip, the desired highlight value in the second strip and the desired shadow value in the third strip, measuring the corresponding densities, and calculating basic main, bump, and flash exposures with the aid thereof.

13. Exposure control system according to claim 8, wherein exposures are determined in units of light, and exposure illumination is counted in terms of such light units and is extinguished as soon as the predetermined number of light units is reached in counting.

14. Exposure control system according to claim 8, wherein exposures are determined in light units by repetitively integrating electrical current flow through illumination-responsive electrical resistance, counting the number of such repetitions, and de-energizing the exposure illumination as soon as the counted number of repetitions equals the predetermined number of exposure light units.

15. Light-integrating photographic exposure control apparatus, comprising photo-responsive means including a photodiode adapted to vary in electrical resistance when light is incident thereon, lamp means for producing such incident light, monostable charge-discharge means interconnected with such varying resistance determining its repetition periodicity, iterative counter relay means operatively connected thereto and adapted to count each repetition of the monostable means and adapted to hold relay connections closed to energize such lamp means from a suitable energy source until reaching a predetermined count and to open such relay connections to de-energize such lamp means upon reaching such predetermined count.

16. Exposure control apparatus according to claim 15, wherein the charge-discharge means functions as means for repetitively integrating the flow of current through the photo-diode.

17. Exposure control apparatus according to claim 16, wherein such integrating means includes an integrated circuit of the type designated as No. 555 and associated circuitry comprising a fixed capacitance and the densitometer photodiode variable resistance as elements of its RC time constant.

* * * * *